Jan. 23, 1962 H. F. VON THUENGEN 3,017,964
ONE-WAY BRAKE OR CLUTCH MECHANISM, PARTICULARLY FOR
FREE WHEELING DEVICES AND ANTI-ROLLBACK DEVICES
Filed Nov. 26, 1956 3 Sheets-Sheet 1
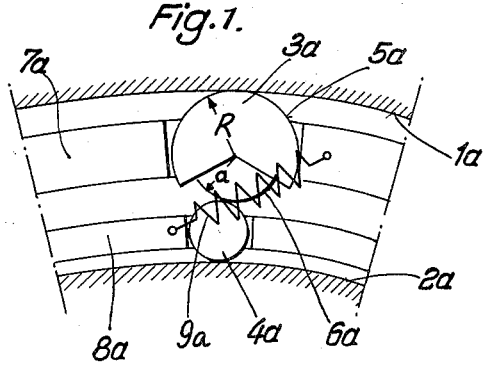
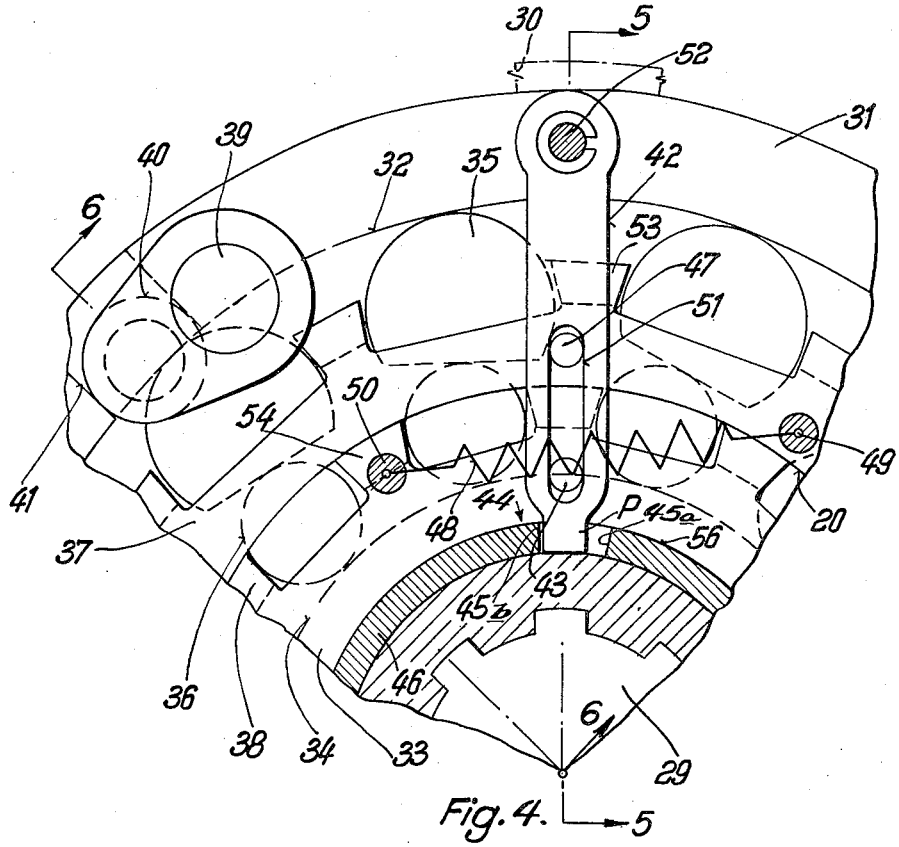
Inventor:
HUBERT FREIHERR VON THUENGEN,
BY Parry & Giere
ATTORNEY

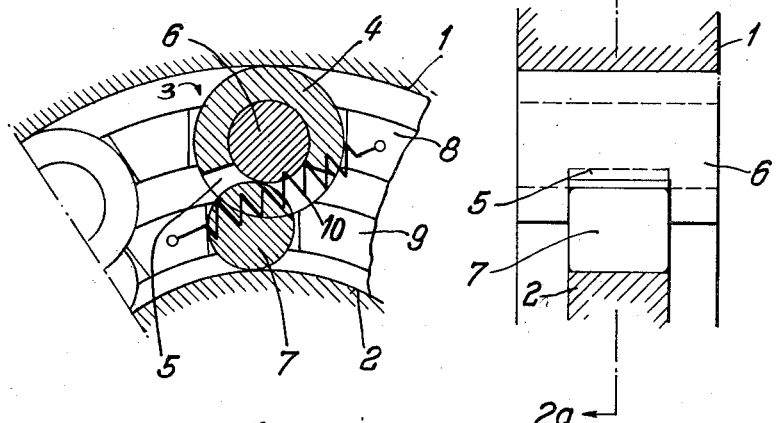
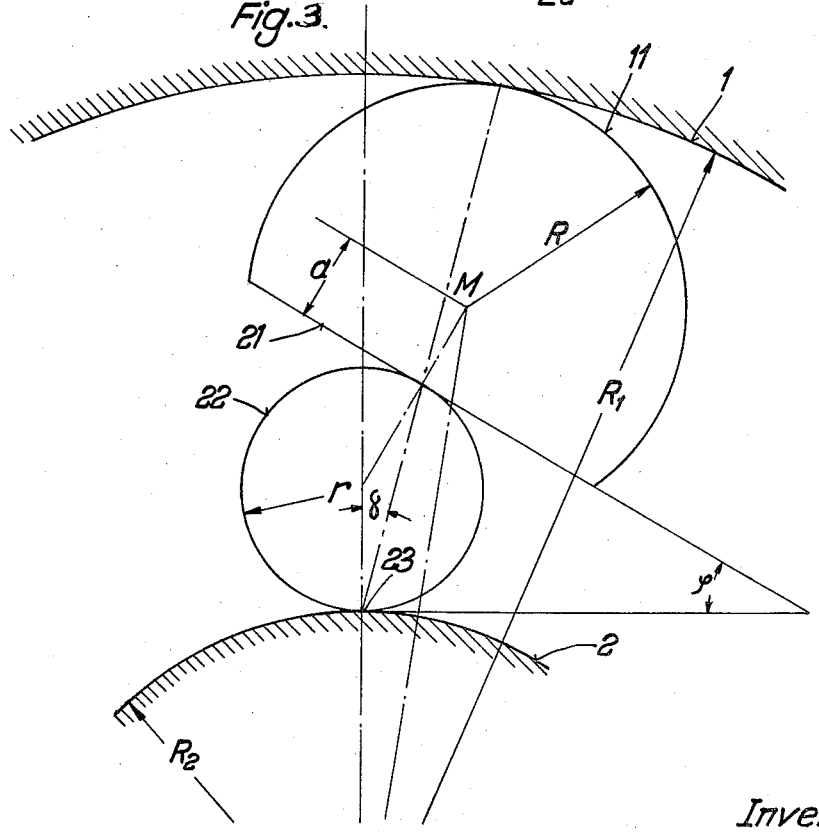

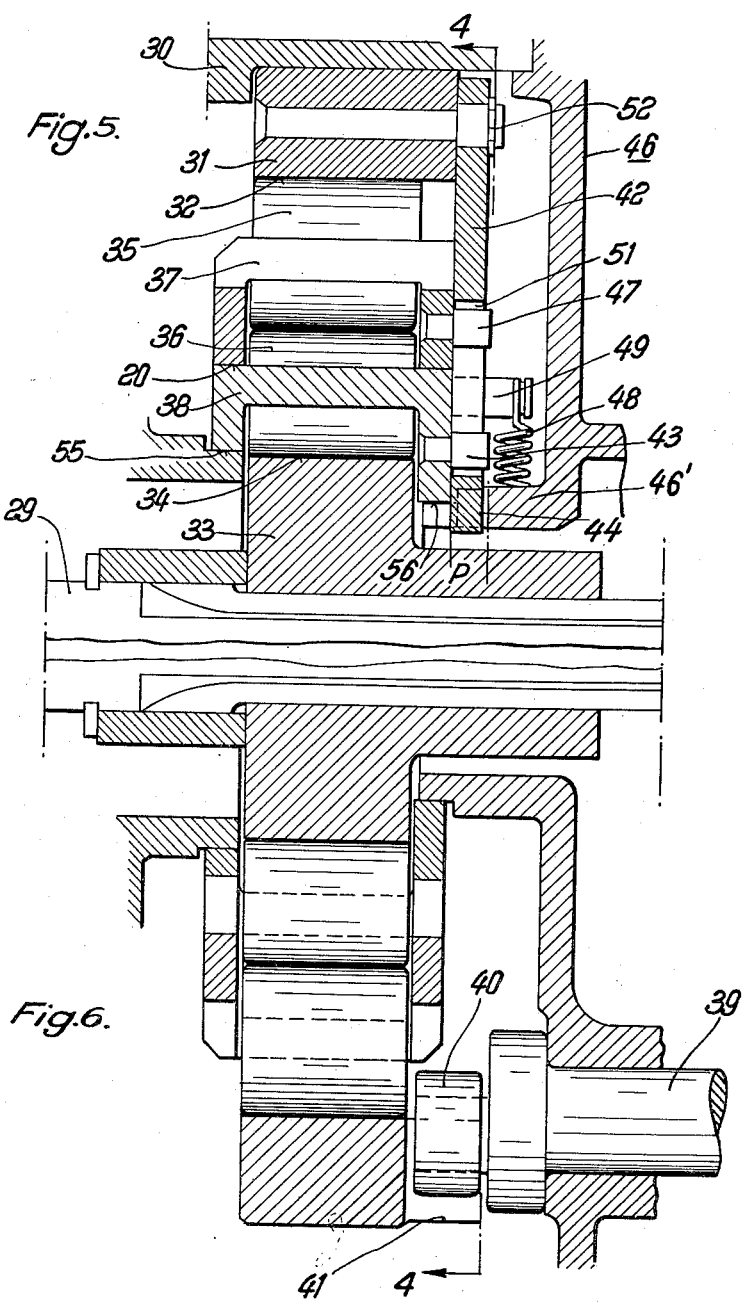

United States Patent Office 3,017,964
Patented Jan. 23, 1962

3,017,964
ONE-WAY BRAKE OR CLUTCH MECHANISM, PARTICULARLY FOR FREE WHEELING DEVICES AND ANTI-ROLLBACK DEVICES
Hubert Freiherr von Thuengen, Friedrichshafen, Germany, assignor to Zahnradfabrik Friedrichshafen, Friedrichshafen a.B., Germany
Filed Nov. 26, 1956, Ser. No. 624,390
Claims priority, application Germany Nov. 30, 1955
14 Claims. (Cl. 188—82.84)

This invention relates to clutches and more particularly to clutches which may be adapted to anti-rollback devices or to free wheeling devices, the disclosure herein constituting a continuation-in-part of co-pending application Serial No. 564,564, filed February 9, 1956, now abandoned.

It is an object of the invention to provide a clutch construction of safe action and of simple manufacture.

It is another object of the invention to povide a construction having long wear characteristics.

It is a further object of the invention to provide a clutch which may be readily released under load.

In carrying out the above objects, a clutch construction is provided wherein two concentric sets of roller elements are utilized, annularly arranged in concentric rings, a roller element in each annular set co-acting with a roller element in the other set to effect torque transmitting engagement. Thus, each annular set comprises a ring of rollers, which rings are disposed intermediate a part of concentric driving and driven elements, torque being transmitted from the driving to the driven element through the engaged roller pairs.

A particular feature of the invention resides in the provision of different effective radii for one set of rollers, such that engagement with the co-acting ring of rollers is at a foreshortened distance relative to a distance nearly equal to the sum of the exterior radii of both rollers. The measurements of the one set of rollers are chosen in such a manner that the two effective radii are proportionate or nearly proportionate to the radii of the surfaces of the concentric driving and driven elements. This permits the driving and the driven element to rotate at equal angular velocity with respect to the gripping rollers. As a result, a safe gripping engagement between both clutch elements and a larger angle of gripping and a reduced wear are secured. A further feature resides in the mode of manual control for engagement and release under load.

A detailed description of the invention will now be given in conjunction with the appended drawing in which:

FIG. 1 shows the basic form of the invention, being a partial circumferential view of the clutch illustrating a set of gripping rollers;

FIG. 2 shows a modification of the rollers in a longitudinal view;

FIG. 2a is a cross section through the line 2a—2a of FIG. 2;

FIG. 3 shows another arrangement of rollers, the cages being eliminated for clarity;

FIG. 4 shows, partiallly in front elevation and partially in section on the line 4—4 of FIG. 5, a free wheel clutch equipped with rollers as illustrated in FIG. 3;

FIGS. 5 and 6 are respective sections 5—5 and 6—6 of FIG. 4.

FIG. 1 shows driving and driven rings $1^a$ and $2^a$ between which are shown two gripping rollers $3^a$ and $4^a$ in drive engagement. Roller $3^a$ has two partial cylindrical surfaces $5^a$ and $6^a$ of different effective radii "R" and "a." The two rollers are located in respective cages $7^a$ and $8^a$. They are engaged with each other by tension spring $9^a$. FIG. 1 is the basic form of the invention.

FIG. 2a is a cross section through line 2a—2a of FIG. 2 showing an outer driven or gripping ring 1 and an inner driving or gripping ring 2. An outer roller 3 is shown which, for the sake of easy production, is composed of two parts, viz., a hollow cylinder 4 with a cut-out sector 5, and a solid inner cylinder 6, which is force fitted into cylinder 4. Through the cut-out sector 5 a roller 7 engages roller 6. Roller 7 also engages ring 2. The outer surface of the hollow cylinder 4 engages ring 1. All outside rollers, dispersed over the circumferences of the circle, are carried in a cage 8, and all inside rollers 7 in another cage 9. The cages 8 and 9 are connected by tension springs 10 so that the rollers are engaged as shown and engage respective surfaces 1 and 2.

FIG. 3 shows a further combination of rollers which engage respective driving and driven rings 1 and 2 or 1a and 2a. The larger roller 11 with an outside radius "R" has been cut off chordally to form a flat surface 21 at a radial distance "a" from the center "M" of the roller 11. The surface 21 engages the smaller roller 22, which on its other side engages ring 2 at 23.

The surface 21, and the tangent at the point 23 form the gripping angle $\varphi$. The measurements for "R," and "a" of the roller 11 must be chosen in such a way that the rollers are sure to grip whenever the ring 2 is rotated. This is the case if the effective radius "R" and radius portion "a" of the outer rollers are proportionate or nearly proportionate to the radii of the ring surfaces 1 and 2. Thus, $R:a=R_1:R_2$, exactly or approximately. However, the angle $\varphi$ may be larger than would be permissible in the case of normal clutches with only one roller and a fixed outer ring. Accordingly, the gripping areas of the clutch are less worn under pressure.

Referring now to FIGS. 4, 5, and 6, a clutch construction of FIG. 3 is shown for use as an anti-rollback device. FIG. 4 is a partial view of a cross section on the line 4—4 of FIG. 5 showing a device for disengaging the clutch when under load. Thus, where the invention is used as an anti-rollback device, reverse torque from the engine may then be transmitted to the rear wheels of the vehicle, for reversing the vehicle, without impedance by virtue of the anti-rollback device being in the system.

FIGS. 4 and 5 show a driving shaft 29 with splines which key the shaft to an inner ring-like element or collar 33 of a roller type clutch. The inner collar 33 has an engageable outer surface 34. An outer ring-like element or collar 31 has a roller engaging surface 32 and is mounted in a fixed housing 30, collar 31 being normally non-rotative but being oscillatable to effect disengagement of gripping rollers, as will be apparent from the description to follow. The rings 31 and 33 are, in effect, gripping rings in the sense that they can be gripped by intermediate rollers. The open end of the fixed housing 30 is closed by cover 46 which is screwed on (screws not shown) to housing 30.

The same mechanism shown in FIGS. 4, 5, and 6 can also be used for purposes of a free wheeling clutch, it being understood that ring 31 is then permitted to rotate and that shaft 39, together with roller 40 and housing 30, revolve together therewith.

A manually rotative shaft 39 actuatable by a lever (not shown) is mounted rotatably in the cover 46. This shaft carries eccentrically a roller 40 disposed in a radial groove 41 of the outer collar 31, the shaft and roller serving to hold the collar 31 against rotation. However, by turning shaft 39 clockwise relative to the position shown in FIG. 4, collar 31 is also turned clockwise by engagement of roller 40 with the side of groove 41. Two concentric rows of rollers 35 and 36 are disposed between the two surfaces 32 and 34. Each of the outer rollers 35 is located between two bridges 53 of the cage 37. The inner rollers are located between bridges 54 of the cage 38. The cage 37 is mounted with the inner cylindrical surfaces 20 of its side flanges on the outer surface of inner cage 38. The latter cage has side flanges which rotate on two more surfaces 55 and 56 of the fixed housing. The cages 37 and 38 are biased by spring 48, which is attached to pins 49 and 50 secured to respective cages 37 and 38, so that rollers 35 and 36 are maintained in engaged condition in pairs as shown on FIG. 4.

A lever 42 is pivoted to a pin 52 secured to outer ring 31. Two pins 43 and 47, pin 43 being attached to the inner cage 38, and pin 47 to the outer cage 37, protrude into a slot 51 of the lever 42. The inner end P of the lever 42 rests in a slot 44 machined in the housing cover projection 46'. End P remains in slot 44 at all times and is normally disposed intermediate slot edges 45a and 45b.

Whenever the driving shaft 29 turns counterclockwise, during torque transmission for forward drive of a vehicle the rollers 35 and 36 are released from engaged condition and the shaft 29 with the inner ring 33 can rotate freely in relation to the normally fixed outer clutch collar 31. When the shaft 29 tends to rotate clockwise as when a vehicle tends to roll backwards on a steep hill, rollers 36 engage respective rollers 35 which lock frictionally against fixed clutch collar 31 to prevent any further reverse rotational movement of shaft 29.

To free the shaft 29 for reverse torque transmission, the manual shaft 39 is rotated to actuate roller 40 in groove 41 whereby clutch collar 31 is rotated clockwise (FIG. 4) to a degree determined by the width of slot 44, the end P of lever 42 moving to engagement with edge 45a. The lever movement is assisted by the driving engagement between the roller sets which is momentarily retained at the time ring 31 is given the slight manual clockwise rotation, so that momentarily the cages, the clutch collars 31 and 33, and the lever 42 rotate together. As a result lever 42 rotates clockwise around edge 45a after abutment of end P therewith so that the elements 31, 37 and 38 turn by different angles, depending on the distances of their engaging pins 52, 47, 43 from the end "P" of the lever. As a result the rollers 35 and 36 are disengaged, so that shaft 29 with ring 33 can now rotate freely clockwise, the anti-rollback effect being defeated.

I claim:

1. A device of the class described comprising a pair of concentric gripping rings radially spaced from each other, inner and outer circular arrays of rollers intermediate said gripping rings, each roller in the inner array being frictionally engageable with a roller in the outer array, the rollers thus effecting torque transmitting pairs, each roller in the inner array being frictionally engageable with the exterior surface of said inner gripping ring, each roller in the outer array being frictionally engageable with the inner surface of the outer gripping ring, wherein the sum of the diameters of an inner and an outer roller is in excess of the radial spacing between the outer surface of the inner gripping ring and the inner surface of the outer gripping ring, including a pair of concentric cages, one cage for guiding the inner rollers and the other cage for guiding the outer rollers, the outer cage being supported on the inner cage, and resilient means intermediate said cages for effecting forces in opposite directions on said cages, said forces being transmitted by said cages to said roller pairs to maintain said roller pairs in frictional engagement with each other and with the gripping rings, including means for rotating said outer gripping ring for releasing frictional engagement of said arrays of rollers.

2. A device of the class described comprising a pair of concentric gripping rings radially spaced from each other, inner and outer circular arrays of rollers intemediate said gipping rings, each roller in the inner array being fricitionally engageable with a roller in the outer array, the rollers thus effecting torque transmitting pairs, each roller in the inner array being frictionally engageable with the exterior surface of said inner gripping ring, each roller in the outer array being frictionally engageable with the inner surface of the outer gripping ring, wherein the sum of the diameters of an inner and an outer roller is in excess of the radial spacing between the outer surface of the inner gripping ring and the inner surface of the outer gripping ring, including a pair of concentric cages, one cage for guiding the inner rollers and the other cage for guiding the outer rollers, the outer cage being supported on the inner cage, and resilient means intermediate said cages for effecting forces in opposite directions on said cages, said forces being transmitted by said cages to said roller pairs to maintain said roller pairs in frictional engagement with each other and with the gripping rings, including means for rotating said outer gripping ring for releasing frictional engagement of said arrays of rollers, including means for shifting the cages rotatably with respect to each other for neutralizing the forces acting on the roller pairs and for effecting disengagement of the rollers, and including a housing supporting said outer gripping ring, said means comprising an element carried by said housing for effecting shifting of said outer gripping ring with respect to said housing in a direction opposite to the direction of bias intermediate said cages to effect rotative shifting of said cages with respect to said housing.

3. In a device as set forth in claim 2, including a lever element carried by one of said cages and a relatively stationary element fixed to said housing and engageable by said lever element after a predetermined degree of motion of said outer gripping ring to secure rotative shifting of said cages relative to each other for releasing frictional engagement between said roller pairs.

4. A device of the class described comprising a first inner set of rollers arranged in an inner cage, an inner gripping element, said cage concentrically surrounding said inner gripping element and said rollers being rotatively engageable with the surface thereof; a second set of outer roller elements arranged in an outer cage concentrically surrounding said first set; each roller of said first set being engageable with a respective roller of said second set to form a roller pair; a concentric outer gripping element surrounding said second set and engageable with the rollers thereof, said clutch elements having a radial spacing less than the combined diameters of each roller pair whereby the rollers of each pair are effective to engage each other to transmit torque from one element to the other, the rollers of one set of roller elements having a foreshortened radius, from their respective centers at the point of engagement with respective rollers of the other set to assure a safe gripping engagement between the gripping parts.

5. A device of the class described comprising a first inner set of rollers arranged in an inner cage, an inner gripping element, said cage concentrically surrounding said inner gripping element and said rollers being engageable with the surface thereof; a second set of outer rollers arranged in an outer cage and concentrically surrounding said first set; each roller of said first set being engageable with a respective roller of said second set to form a roller pair; a concentric outer gripping element surrounding said second set and engageable with the rollers thereof, said gripping elements having a radial spacing less than the combined diameters of each roller pair whereby the rollers of each pair are effective to engage each other to transmit gripping torque from one clutch element to the other, said outer gripping element being normally stationary and a mechanism for rotatively shifting said outer gripping element at the will of an operator, said mechanism including means to release engagement between said rings of rollers responsive to rotative shifting of said outer gripping element.

6. In a device as set forth in claim 5, said mechanism comprising a lever pivoted to said outer gripping element and carried thereby and having a pivotal connection with each cage, a fixed element comprising a shoulder, said lever having a portion normally spaced from said shoulder; whereby rotative shifting of said outer gripping element carries said lever to effect engagement of said lever portion with said shoulder to rock said lever and effect relative rotation of said cages for releasing engagement of said roller sets.

7. A device of the class described comprising a first inner set of rollers arranged in a ring, an inner rotary element, said ring concentrically surrounding said inner rotary element and said rollers being engageable with the surface thereof; a second set of outer rollers arranged in a ring concentrically surrounding said first set; each roller of said first set being engageable with a respective roller of said second set to form a roller pair; a concentric outer rotatively shiftable element surrounding said second set and engageable with the rollers thereof, said inner and outer elements having a radial spacing less than the combined diameters of each roller pair whereby the rollers of each pair are effective to engage each other to transmit rotary motion from one element to the other and shifting means for rotatively shifting said outer element at the will of an operator, and release means to release engagement between said rings of rollers responsive to rotative shift of said outer element, and retaining means for retaining said rollers in respective rings.

8. In a device as set forth in claim 7, said retaining means comprising a cage for each set of rollers, a lever pivoted to said outer element and carried thereby and having a connection with each cage comprising a pivot, a shoulder element having a shoulder portion engageable by a portion of said lever, said lever portion being normally spaced from the shoulder of said shoulder element, whereby rotative shifting of said outer element by said shifting means rocks said lever to effect reaction support engagement with the shoulder of said shoulder element to effect relative circumferential motion of said cages to release engagement of said roller sets.

9. A device of the class described comprising a first inner set of rollers arranged in a ring, an inner gripping element, said set of rollers concentrically surrounding said inner element and said rollers being rotatively engageable with the surface thereof; a second set of outer rollers arranged in a ring concentrically surrounding said first set; each roller of said first set being engageable with a respective roller of said second set to form a roller pair; a concentric outer gripping element surrounding said second set and engageable with the rollers thereof, said gripping elements having a radial spacing less than the combined diameters of each roller pair whereby the rollers of each pair are effective to engage each other to transmit torque motion from one element to the other, the rollers of one set of roller elements having a foreshortened radius, from their respective centers, at the point of engagement with respective rollers of the other set to assure a safe gripping engagement between the gripping elements, wherein the radius of each roller of the outer set is to the foreshortened radius of that roller as the radius of the outer element is to the radius of the inner element.

10. A device of the class described comprising a first inner set of rollers arranged in a ring, an inner clutch element, said set of rollers concentrically surrounding said inner element and said rollers being engageable with the surface thereof; a second set of outer rollers arranged in a ring concentrically surrounding said first set; each roller of said first set being engageable with a respective roller of said second set to form a roller pair; a concentric outer clutch element surrounding said second set and engageable with the rollers thereof, said clutch elements having a radial spacing less than the combined diameters of each roller pair whereby the rollers of each pair are effective to engage each other to transmit torque motion from one element to the other, the rollers of one set of roller elements having respective flattened areas to effect a foreshortened radius at the point of engagement with respective rollers of the other set to assure a safe gripping engagement between the clutch parts, wherein the radius of each roller of the outer set is to the radial distance of the flattened area from the center of each roller of the outer set as the radius of the outer element is to the radius of the inner element, and retaining means for retaining said rollers in respective rings.

11. A device of the class described comprising a first inner set of rollers arranged in a ring, an inner rotary gripping element, said ring concentrically surrounding said inner rotary element and said rollers being engageable with the surface thereof; a second set of outer rollers arranged in a ring concentrically surrounding said first set; each roller of said first set being engageable with a respective roller of said second set to form a roller pair, a concentric outer rotatively shiftable gripping element surrounding said second set of rollers and engageable therewith, said gripping elements having a radial spacing less than the combined diameters of each roller pair whereby the rollers of each pair are effective to engage each other to transmit rotary motion from one gripping element to the other, the rollers of one set of roller elements having a foreshortened radius at the point of engagement with respective rollers of the other set to assure a safe gripping engagement between the gripping parts, and means for normally urging the rollers of said sets into engagement with each other, the rollers of said one set having flattened areas to effect said foreshortened radius, and means for rotatively shifting said outer gripping element.

12. A device of the class described comprising a first inner set of rollers arranged in a ring, an inner rotary gripping element, said ring concentrically surrounding said inner rotary element and said rollers being engageable with the surface thereof; a second set of outer rollers arranged in a ring concentrically surrounding said first set; each roller of said first set being engageable with a respective roller of said second set to form a roller pair; a concentric outer rotatively shiftable gripping element surrounding said second set of rollers and engageable therewith, said gripping elements having a radial spacing less than the combined diameters of each roller pair whereby the rollers of each pair are effective to engage each other to transmit rotary motion from one gripping element to the other, the rollers of one set of roller elements having a foreshortened radius at the point of engagement with respective rollers of the other set to assure a safe gripping engagement between the gripping parts, and means for normally urging the rollers of said sets into engagement with each other, the rollers of said one set each comprising a sector of a cylinder, an inner roller within said cylinder and non-rotatively secured thereto, said rollers of said one set being disposed for engagement with respective rollers of said other set, and means for rotatively shifting said outer gripping element.

13. A device of the class described comprising a first inner set of rollers arranged in a ring, an inner rotary element, said ring concentrically surrounding said inner rotary element and said rollers being engageable with the surface thereof; a second set of outer rollers arranged in a ring concentrically surrounding said first set; each roller of said first set being engageable with a respective roller of said second set to form a roller pair; a concentric outer rotatively shiftable element surrounding said second set and engageable with the rollers thereof, said inner and outer elements having a radial spacing less than the combined diameters of each roller pair whereby the rollers of each pair are effective to engage each other to transmit force from one element to the other, said outer element being normally stationary and shifting means for rotatively shifting said outer element at the will of an operator to release engagement between said rings of rollers responsive to rotating of said outer element, and means for normally maintaining said rollers in force transmitting condition.

14. In a device as set forth in claim 13, said shifting means comprising a cage for each set of rollers, a lever pivoted to said outer element and carried thereby and having a connection with each cage comprising a pivot, a fixed element comprising a shoulder, said lever having a portion normally spaced from said shoulder; whereby rotative shifting of said outer element carries said lever to effect engagement of said lever portion with said shoulder to rock said lever and effect relative rotation of said cages for releasing engagement of said roller sets.

References Cited in the file of this patent

UNITED STATES PATENTS

| | | |
|---|---|---|
| 1,792,334 | Thompson | Feb. 10, 1931 |
| 1,846,745 | Merritt | Feb. 23, 1932 |
| 1,867,938 | Dalton | July 19, 1932 |
| 2,090,934 | Borenstein et al. | Aug. 24, 1937 |
| 2,391,350 | Schmidt | Dec. 18, 1945 |

FOREIGN PATENTS

| | | |
|---|---|---|
| 838,844 | Germany | Mar. 12, 1952 |
| 706,345 | Great Britain | Mar. 31, 1954 |